Figures 1, 7:
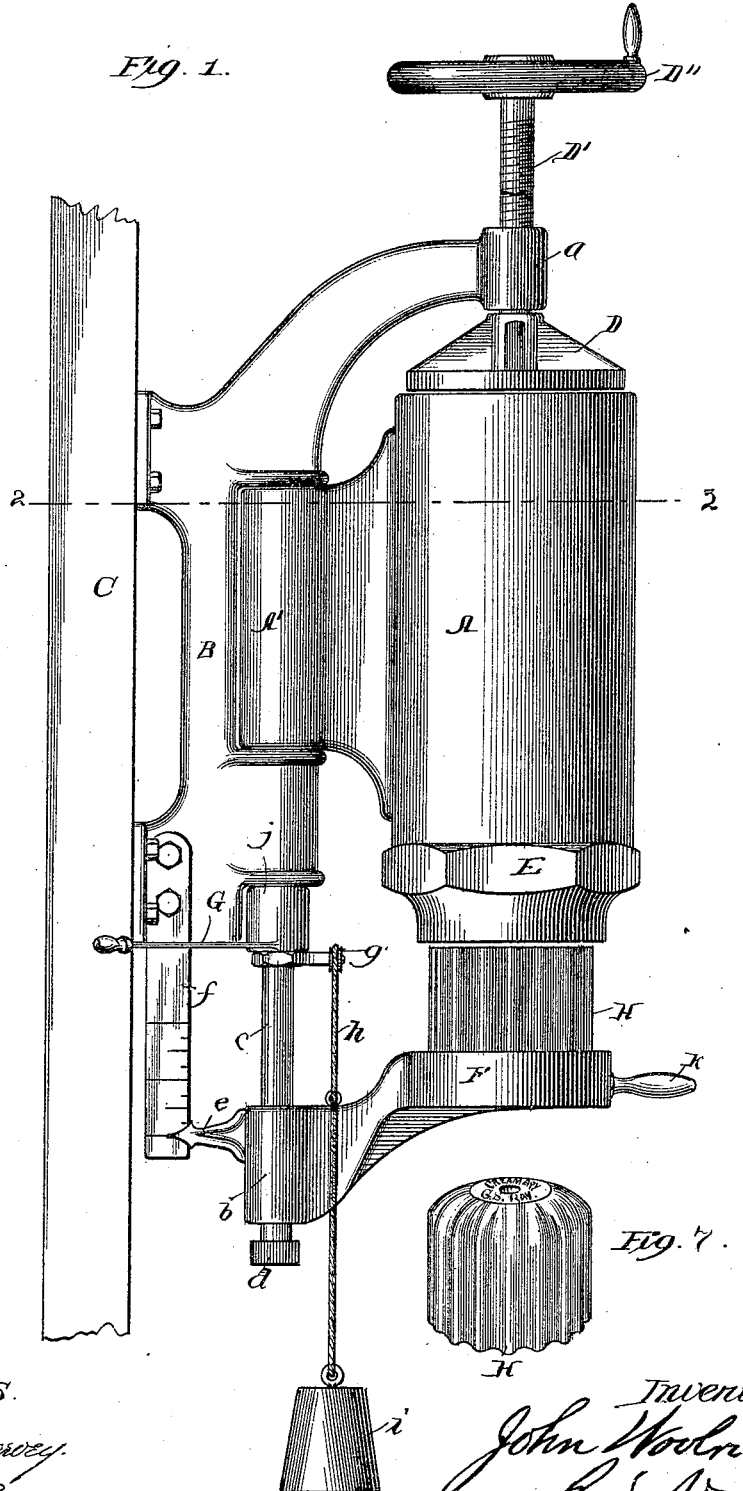

(No Model.) 2 Sheets—Sheet 1.

J. WOOLRIDGE.
BUTTER MOLDING AND MEASURING MACHINE.

No. 461,559. Patented Oct. 20, 1891.

Witnesses:
Chas. O. Thewey.
John L. Jackson.

Inventor:
John Woolridge.
By Bond, Adams & Jones
Attys.

THE NORRIS PETERS CO., PHOTO-LITHO., WASHINGTON, D. C.

(No Model.) 2 Sheets—Sheet 2.
J. WOOLRIDGE.
BUTTER MOLDING AND MEASURING MACHINE.
No. 461,559. Patented Oct. 20, 1891.
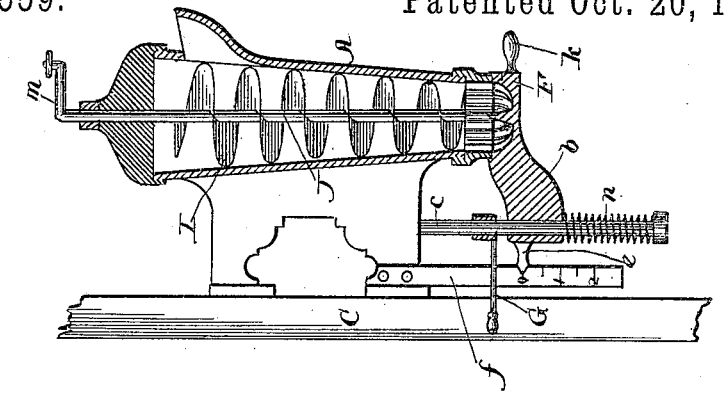
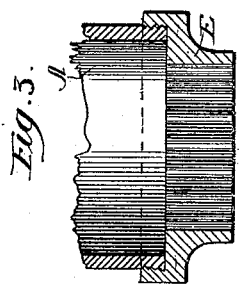
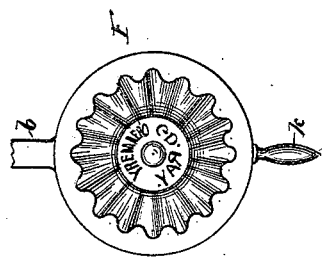
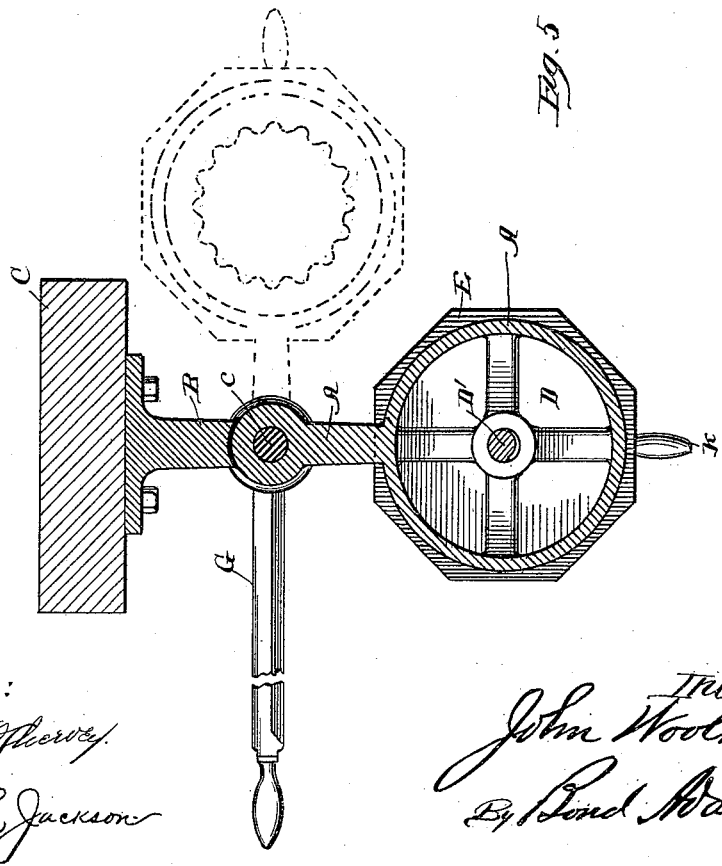
Witnesses:
Chas C. Hervey
John L. Jackson
Inventor:
John Woolridge
By Bond Adams & Jones
Attys.

UNITED STATES PATENT OFFICE.

JOHN WOOLRIDGE, OF CHICAGO, ILLINOIS.

BUTTER MOLDING AND MEASURING MACHINE.

SPECIFICATION forming part of Letters Patent No. 461,559, dated October 20, 1891.

Application filed January 10, 1891. Serial No. 377,380. (No model.)

*To all whom it may concern:*

Be it known that I, JOHN WOOLRIDGE, a citizen of the United States, residing at Chicago, in the county of Cook and State of Illinois, have invented certain new and useful Improvements in Combined Butter Molding and Measuring Machines, of which the following is a specification, reference being had to the accompanying drawings, in which—

Figure 1 is a side elevation. Fig. 2 is a vertical section at line 2 2 of Fig. 1, but with the plunger down in the cylindrical case, showing also by dotted lines the position of the receiving-plate when swung to one side to remove the butter therefrom. Fig. 3 is a detail, being a vertical section of the molding-cap and the lower end of the cylindrical case. Fig. 4 is a detail, being a vertical section of the butter-receiving plate. Fig. 5 is a plan view of the plate shown in Fig. 4. Fig. 6 represents a modification, and Fig. 7 is a perspective view of a lump of butter after being forced through the molding-cap onto the receiving-plate.

This invention relates to devices for forming butter into conveniently-shaped lumps to be handled by retail dealers, and has for its objects to form such lumps of butter of any size and weight desired and to cut such lumps, when formed, from the remainder of the mass of butter from which they have been formed, which I accomplish as illustrated in the drawings, and as hereinafter more fully described.

That which I claim as new will be pointed out in the claims.

In the drawings, A indicates a cylindrical case, to the side of which is formed or rigidly secured a flange or extension A', by means of which the cylindrical case is pivotally secured to a bracket B, which bracket can be secured to a wall C or other support in any suitable manner.

D is a plunger adapted to fit and be moved in the cylindrical case A. D' is a screw-threaded shaft secured to the said plunger and having on its upper end a suitable operating device, such as the hand-wheel D''.

*a* is a screw-threaded socket on the upper end of the bracket B, into which bracket the screw-threaded rod D' passes.

E is a hollow cap screw-threaded or otherwise secured to the lower end of the cylindrical case A. As shown in Fig. 3 and as indicated by the roll of butter, Fig. 7, the interior of this cap E is provided with grooves and ridges to impart corresponding grooves and ridges to the butter that is forced through such cap. It is desirable, therefore, that this cap be affixed removably to the cylindrical case in order that other caps having differently-shaped interior surfaces (but otherwise the same as the cap shown) may be applied for the purpose of giving any other desired shape to the exterior of the butter that is forced through said cap.

F is a plate having a side extension *b*, through which extension *b* a long pin or rod *c* passes, which pin or rod also serves to pivot the cylindrical case A to the bracket B in a plane parallel to the axis of the case. As shown, the lower end of this pin or rod *c* is provided with a head or enlargement *d* to prevent the accidental withdrawal of the receiving-plate F. As shown in Figs. 4 and 5, the upper face of the receiving-plate F is hollowed out in any desired form which it is desired to impart to the butter, and, as shown, in the center it may be provided with raised letters or characters forming words descriptive of the quality of the butter, which will imprint such words on the lump of butter. As shown, such hollowed-out portion is wider at the top than at the bottom for the purpose of allowing the butter on such plate to be the more readily removed therefrom.

*e* is a pointer, which, as shown, is rigidly secured to the side extension *b*.

*f* is a suitable plate provided with the necessary marks or figures, and is secured to the bracket B in any suitable manner in such manner as to coact with the dial *e* and indicate the weight of the butter that is forced onto the receiving-plate F. The location and arrangement of the indicating-plate *f* may of course be varied from that shown.

*g* is an arm rigidly fixed to and extending out from the rod *c* and having on its outer end a pulley *g'*, over which a rope *h* passes. One end of this rope *h* is secured, as shown, to the side extension *b* and the other end to a suitable weight *i*, the object of which will be explained later on.

G is a knife rigidly secured to a rotatable collar *j* on the rod *c*, which collar is, as shown, held in position on such rod between the arm *g* and the bracket B. The knife G is so located as to be in line with the lower edge of the molding-cap E, as shown.

The operation of the device is as follows: The plunger D is drawn up by means of the hand-wheel D" and rod D' sufficiently to entirely withdraw it from the cylindrical case A, as shown in Fig. 1. The case A is then to be swung around on the rod *c*, so that the open upper end of such case is entirely at one side of the plunger D. The case A is then to be filled with butter and then swung back directly under the plunger D, which is to be forced down by means of the screw-threaded rod and hand-wheel, and as the plunger descends the butter will be forced out through the cap E onto the receiving-plate F, the butter being given the form of the interior of such cap E as it passes through such cap, and the form of the hollowed-out portion of the plate F will also be impressed upon the lower end of the column of butter. As the butter continues to be forced against the plate F said plate F will slide downward on the rod *c*, and when the pointer *e* indicates on the plate *f* that the desired weight of butter has been forced below the lower end of the cap E further downward movement of the plunger D is arrested and the knife G swung around under the lower end of the cap E, thus cutting off the butter at that point from the mass within the case A. After the desired amount of butter has been severed from the mass in the case the receiving-plate F is to be swung around by means of the handle *k* sufficiently far to allow the lump of butter H to be removed. After such lump of butter has been removed the plate F is to be swung back, the pointer *e*, coming in contact with the plate *f*, in the construction shown serving as a stop for its swinging movement on the return. The weight *i* serves to return the plate F to its normal position against the base of the cap E in position to receive another lump of butter when forced down upon it, as described. As the plunger D fits snugly within the case A, it will be seen that such case is held firmly in position by the bracket B as the screw-threaded rod D', connected to said plunger, passes through said bracket.

In Fig. 6 I have shown a modification in which the cylindrical case is rigidly secured to the bracket, and instead of having its upper end open, as in the form already described, it is provided with a cap, and the butter is placed in the case through a side opening *l*.

In the construction shown in Fig. 6 I employ instead of the plunger D a spiral conveyer I, operated by means of a central rod J, passing through the cap of the case and provided on its upper end with a crank *m* or a hand-wheel similar to that shown in Fig. 1. When a spiral conveyer is employed, as shown in Fig. 6, the case A may be slightly conical, as shown in said figure.

Instead of the weight *i* a suitable spring, as *n*, may be employed to bear against the receiving-plate and perform the same functions that are performed by the weight *i* and its connections.

By the employment of my invention a very simple and efficient device is provided which is especially adapted for use in retail stores where butter is sold in small quantities of from one to five pounds. The case A can be very easily and quickly filled, and can be made of a size to contain a considerable amount of butter, and by a few rapid turns of the wheel D" the desired quantity of butter in an attractive form can be discharged upon the receiving-plate F, and quickly severed from the mass in the case by means of the swinging knife G. If desired, the cap E can be left plain, so as to produce a smooth surface on the butter, and the plate F may have a flat surface instead of the one shown, if desired. As the upper end of the case A is always closed after the butter has been placed in such case, and as the normal position of the receiving-plate F is up against the lower end of the cap E, it will be seen that the butter in the case A is effectually guarded at all times from any dust or other floating particles in the air.

As the device is to be made of metal, it is desirable that the case A and the other parts of the device that come in contact with the butter should be lined with some material that will not affect the taste or looks of the butter.

That which I claim as new, and desire to secure by Letters Patent, is—

1. The combination, with a case A, of devices for forcing butter through the case, a cap E at the discharge end of the case, a plate F, moved by the butter as it issues from the cap, and mechanism operated by the movement of the plate for indicating the weight of the butter discharged from the case, substantially as described.

2. The combination of a case adapted to receive butter, devices for forcing the butter through the case, and a plate movable in the plane of the case to and from its discharge end and moved by the discharging butter in the direction of such discharge, substantially as described.

3. The combination, with a case adapted to receive butter and devices for forcing the butter through the case, of a plate movable in the plane of the case to and from its discharge end and moved by the discharging butter in the direction of such discharge, and devices operated by the movement of the plate for indicating the weight of butter discharged from the case, substantially as described.

4. The combination, with a case adapted to receive butter, and devices for forcing the butter through the case, of a laterally-swinging plate movable in the plane of the case to and from its discharge end and moved by the discharging butter in the direction of such discharge, substantially as described.

5. The combination of a bracket, a case adapted to receive butter, a pivot pin arranged parallel with the axis of the case and serving to pivotally connect such case to the bracket, devices for forcing butter through the case, a molding-cap at the discharge end of the case, and a laterally-swinging plate pivotally supported by and movable along the length of the pivot-pin of the case, substantially as described.

6. The combination of a bracket, a case adapted to receive butter, a pivot-pin arranged parallel with the axis of the case and serving to connect the latter with the bracket, devices for forcing the butter through the case, a laterally-swinging plate journaled upon the pivot-pin of the case and moved by the discharging butter, and an indicator operated by the movement of the plate to indicate the weight of butter discharged from the case, substantially as described.

7. The combination of a case adapted to receive butter, devices for forcing the butter through the case, a plate movable in a plane coincident with the axis of the case and moved outward by the discharging butter, and devices automatically operating to move the plate toward the case, substantially as described.

8. The combination, with a case adapted to receive butter and devices for forcing the butter through the case, of a plate moved by the discharging butter in a plane coincident with the axis of the case, and a knife arranged to cut the butter between the case and said plate, substantially as described.

9. The combination of the case A, having side extension A', and devices for forcing butter through the case, bracket B, molding-cap E at the discharge end of the case A, and receiving-plate F, having side extension $b$ and rod $c$, secured in the bracket B and passing through the parts A' and $b$, substantially as and for the purpose specified.

JOHN WOOLRIDGE.

Witnesses:
ALBERT H. ADAMS,
ROBERT A. MILLAR.